(12) United States Patent
Kushnerev et al.

(10) Patent No.: US 12,368,302 B2
(45) Date of Patent: Jul. 22, 2025

(54) POWER SUPPLY APPARATUS BASED ON PHOTOVOLTAIC PANELS

(71) Applicant: SUN WORLD LIMITED LIABILITY COMPANY, Respublika Krym (RU)

(72) Inventors: Dmitriy Nikolaevich Kushnerev, Bahchisarayskiy r-on (RU); Irina Aleksandrovna Kushnereva, Bahchisarayskiy r-on (RU)

(73) Assignee: Sun World Limited Liability Company (RU)

( * ) Notice: Subject to any disclaimer, the term of this patent is extended or adjusted under 35 U.S.C. 154(b) by 0 days.

(21) Appl. No.: 18/574,761

(22) PCT Filed: Feb. 21, 2023

(86) PCT No.: PCT/RU2023/000042
§ 371 (c)(1),
(2) Date: Dec. 28, 2023

(87) PCT Pub. No.: WO2024/172683
PCT Pub. Date: Aug. 22, 2024

(65) Prior Publication Data
US 2025/0079845 A1     Mar. 6, 2025

(30) Foreign Application Priority Data
Feb. 16, 2023   (RU) ........................... RU2023103614

(51) Int. Cl.
*H02J 3/38*   (2006.01)
*H02J 3/32*   (2006.01)
*H02J 7/35*   (2006.01)
*H02S 40/30*  (2014.01)

(52) U.S. Cl.
CPC .................. *H02J 3/38* (2013.01); *H02J 3/32* (2013.01); *H02J 7/35* (2013.01); *H02S 40/30* (2014.12); *H02J 2207/50* (2020.01); *H02J 2300/26* (2020.01)

(58) Field of Classification Search
CPC ........ H02J 3/38; H02J 3/32; H02J 7/35; H02J 2300/26; H02J 2220/50; H02S 40/30
See application file for complete search history.

(56) References Cited

U.S. PATENT DOCUMENTS

2017/0346389 A1* 11/2017 Lung .................. H02M 7/5387
2023/0246476 A1*  8/2023 Pahlevaninezhad .... H02J 3/381
                                                    307/64

* cited by examiner

*Primary Examiner* — Robert L Deberadinis
(74) *Attorney, Agent, or Firm* — Boyle Fredrickson S.C.

(57) ABSTRACT

The invention relates to converter technology and can be used to efficiently extract the power from solar panels, convert and transmit the obtained energy to the industrial grid, and service the load to consumers. A power supply apparatus based on photovoltaic panels, which comprises a solar panel unit, a DC/DC converter, an inverter, a DC/DC converter control unit, an inverter control unit, and which is characterized in that it additionally includes a voltage pulse unit installed between the solar panel and the DC/DC converter, wherein the control unit of the DC/DC converter is made with an additional function for controlling the voltage pulse unit.
The technical result achieved by using the proposed apparatus is more energy obtained from the solar panel unit.

3 Claims, 7 Drawing Sheets

POWER SUPPLY APPARATUS BASED ON PHOTOVOLTAIC PANELS

FIELD OF THE INVENTION

The invention relates to converter technology and can be used to efficiently extract the power from solar panels, convert and transmit the obtained energy to the industrial grid, and service the load to consumers. It also allows to charge the rechargeable batteries and supercapacitors with energy obtained from the grid, along with subsequent conversion, as needed, into alternating voltage of industrial frequency to provide guaranteed uninterrupted power supply to consumers.

PRIOR ART

An apparatus known from the prior art is powered by solar batteries and comprises a solar module, a first DC-DC converter, a rechargeable battery, a second DC-DC converter, a controller and a load. (RU2503120 An Apparatus Powered by Solar Batteries, IPC H02M 3/156, Dec. 27, 2013).

Such apparatus has the following disadvantages:
1. Using a traditional method to track the maximum power point at the uniform illumination;
2. No communication with the industrial grid in order to ensure that the battery is charged in bad weather conditions, no capability to release the power to the grid.

A power installation known from the prior art comprises solar cell batteries, energy storage units, a DC/DC converter, a DC/AC converter, automatic circuit breakers (RU2397593 A Power Installation and a Method to Control It, IPC H02J 7/35, H01L 31/00, Aug. 20, 2010).

Such apparatus has the following disadvantages:
1. No capability to release the power obtained from solar panels to industrial grid;
2. Using a traditional method to track the maximum power point at the uniform illumination.

An apparatus and a method to track the maximum power point for an inverter when using solar panels is known from the prior art, wherein such apparatus comprises solar panels, an inverter, a system controller, and a load. (U.S. Pat. No. 7,158,395B2 Method and apparatus for tracking maximum power point for inverters, for example, in photovoltaic applications, IPC H02M 7/44, Jan. 2, 2007).

Such apparatus has the following disadvantages:
1. Tracking a traditional maximum power point according to the volt-ampere characteristic (VAC) of the panel unit and its drift with the change of temperature and uniform change of the illumination, resulting in inefficient power extraction from the solar panel unit;
2. No capability to use such apparatus as a backup power supply in case of power failure in the grid.

A power conversion system with maximum power point tracking is also known from the prior art and comprises a maximum power point tracking (MPPT) unit, a DC bus, a power converter, and a converter controller. (US20130027997A1 Maximum power point tracking for power conversion system and method thereof, IPC H02M 7/44, Jan. 31, 2013).

Such apparatus has the following disadvantages:
Tracking a traditional maximum power point according to the volt-ampere characteristic (VAC) of the panel unit and its drift with the change of temperature and uniform change of the illumination, resulting in inadequate power extraction from the solar panel unit;
No energy storage capacity (battery or supercapacitor) and, therefore, the inability to power the load with such system in case of grid failure or low energy output by solar panels.

A system and method for managing the power output of a photovoltaic cell is known from the prior art and comprises solar panels, an inverter, a control unit, a switch-mode power and load supply. (US2015244313A1 System and Method for Managing the Power Output of a Photovoltaic Cell, IPC G0IR 31/40, Aug. 27, 2015).

Such apparatus has the following disadvantages:
1. The voltage pulses are applied to the solar panels with the option to adjust the pulse repetition rate, amplitude, pulse duration (duty cycle), but without allowing to adjust the rising and falling edges of these pulses, as well as without allowing to apply aperiodic alternating voltage pulses to the solar panels, which results in inefficient power extraction from the solar panel unit;
2. No option to use such apparatus as a backup power supply in case of grid voltage failure.

An apparatus of guaranteed power supply based on renewable energy sources (RES) is the closest to the claimed solution in terms of technical essence (RU207387U1, Oct. 26, 2021). That patent tracks all zones on the VAC, if there was a partial shading and a power peak appeared in the left branch of the VAC. When that point is reached, the energy is extracted from a solar panel (SP) by using a traditional method. For example, there is a step-up converter that extracts current from the panel so that the product of current and voltage from the panel has the maximum value. This is similar to a rheostat, where a position of the knob (impedance) of the rheostat, that allows to receive the maximum energy from the SP, is selected.

A disadvantage of such apparatus is that it tracks several local zones on the VAC of the panel unit and drifts with the change of temperature and uniform change of the illumination, and that it also tracks the appearance of maximum power point at partial shading and extracts power at such point, resulting in inefficient power extraction from the solar panel unit.

SUMMARY OF INVENTION

The technical problem addressed by this invention is to increase the efficiency of the apparatus comprising a solar panel (SP) unit and a converter, to track the true maximum power point under actual operating conditions; to transmit the received power to the grid and for the load, and to charge the energy storage unit from the solar panel unit and from the grid. This increases the efficiency of power extraction from solar panel unit and improves the reliability of the power supply to the consumers.

The technical result achieved by using the proposed apparatus is more energy obtained from a solar panel unit.

It also additionally improves the reliability of guaranteed power supply to the consumers which is provided, among other things, by using the energy storage units that receive the energy from solar panels and the grid based on a specified algorithm and, in the event of the grid's failure or a decrease in the energy received from solar panels, ensure uninterrupted power supply to the consumers by adding energy from the storage unit to the energy received from solar panels on a common DC bus, and subsequently converting it into AC and supplying power to the consumers.

The technical problem is addressed and the technical result is achieved by the fact that the power supply apparatus based on photovoltaic panels comprises a solar panel unit, a current and voltage sensor unit of solar panel unit, a DC/DC converter, a DC bus, an inverter, a current and voltage sensor unit at the converter's output, a DC/DC converter control unit, an inverter control unit, a control and switching microcontroller, a current and voltage sensor unit of DC bus, an LC filter and a radio interference filter, a current and voltage sensor unit for the load, wherein the apparatus additionally includes a voltage pulse unit installed between the solar panel and the DC/DC converter, wherein the control unit of the DC/DC converter is made with an additional function for controlling the voltage pulse unit and with an option to adjust voltage pulses in terms of their amplitude, frequency, duration, polarity, as well as in terms of the pulse rise time and pulse fall time.

In addition, the apparatus includes a bidirectional DC/DC converter for charging/discharging a rechargeable battery and a rechargeable battery.

In addition, the apparatus includes a bidirectional DC/DC converter for charging/discharging a supercapacitor unit and a supercapacitor unit.

EMBODIMENT OF THE INVENTION

A power supply apparatus based on photovoltaic block comprises a solar panel unit, a voltage pulse unit, a current and voltage sensor unit of solar panel unit, a DC/DC converter, a DC bus, a current and voltage sensor unit of DC bus, a reversible inverter, an LC filter, a current and voltage sensor unit at the converter's output, a radio interference filter, a current and voltage sensor unit for the load, a load, a controlled grid switch, a current and voltage sensor unit of the grid, a grid, a control unit of the DC/DC converter and of the voltage pulse unit, a control unit of the reversible inverter, and a microprocessor control and switching unit.

In addition, the apparatus may contain a rechargeable battery (RB) and a bidirectional DC/DC converter for charging/discharging the rechargeable battery, supercapacitor unit (SCU) and a bidirectional DC/DC converter for charging/discharging the supercapacitor unit, as well as a control unit for RB and SCU.

Figure 1:
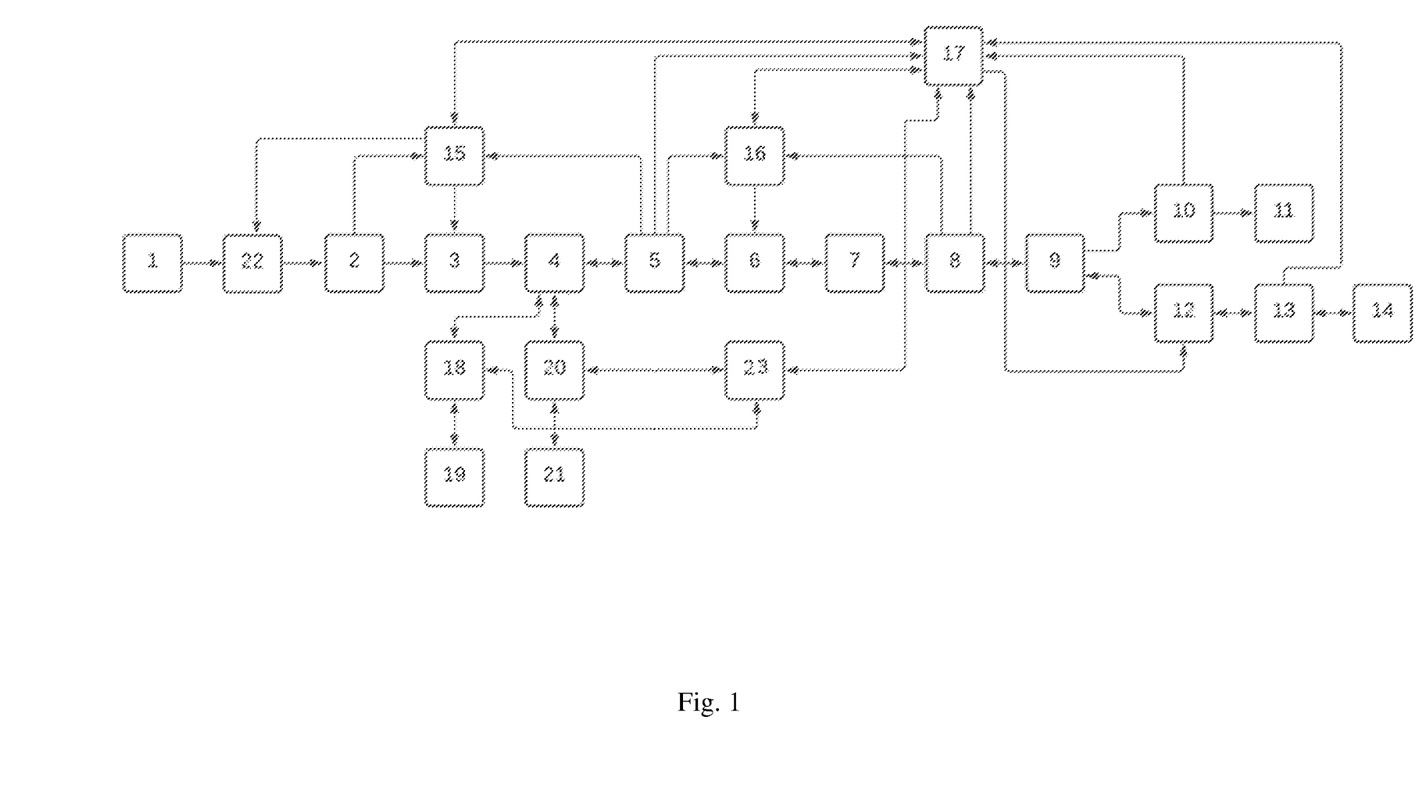
FIG. 1. The structural block diagram of a power supply apparatus based on photovoltaic panels.

The claimed solution is explained with the graphics, where FIG. 1 shows a structural block diagram of power supply apparatus based on photovoltaic panels.

The diagram shows a solar panel unit (1), a current and voltage sensor unit of solar panel unit (2), a DC/DC converter (3), a DC bus (4), a current and voltage sensor unit of DC bus (5), a reversible inverter (6), an LC filter (7), a current and voltage sensor unit at the converter's output (8), a radio interference filter (9), a current and voltage sensor unit for the load (10), a load (11), a controlled grid switch (12), a current and voltage sensor unit of the grid (13), a grid (14), a control unit of the DC/DC converter and of the voltage pulse unit (15), a control unit of the reversible inverter (16), a microprocessor control and switching unit (17), a bidirectional DC/DC converter for charging/discharging the rechargeable battery (18), a rechargeable battery (RB) (19), a bidirectional DC/DC converter for charging/discharging the supercapacitor unit (20), a supercapacitor unit (SCU) (21), a voltage pulse unit (22), control unit for RB, SCU (23).

The apparatus operates as follows.

The voltage and current from the solar panel unit (1) are fed to the DC/DC converter (3) through the voltage pulse unit (22) and the current and voltage sensor unit from the solar panel unit (2). The information on the voltage and the current from the solar panels is provided to the control unit of DC/DC converter and voltage pulse unit (15) in accordance with the specified algorithm, and the unit generates the control signals to operate the DC/DC converter and the voltage pulse unit, as a result of which a maximum possible power under a given temperature and illumination is extracted from the solar panels. The voltage pulse unit can be controlled together with the DC\DC converter by using a single control unit, or its control can be arranged within the voltage pulse unit itself provided that there are the current and voltage sensors and they can be used to receive data. The obtained electric power is fed to the DC bus (4). From the DC bus, the voltage and current are fed through the current and voltage sensor unit of DC bus to the reversible inverter (6) which, in the direct conversion mode, converts DC voltage and current into AC voltage and current, for example, by means of pulse width modulation (PWM). Next, the power PWM signal is fed to the input of LC filter (7), after which the filtered low frequency signal of the grid is fed to the input of the current and voltage sensor unit at the converter's output (8). After that, the signal is fed to the input of radio interference filter (9). Next, the output current and voltages are supplied to the load (11) through the current and voltage sensor unit for the load (10) and to the grid (14) is supplied through the controlled grid switch (12) and the current and voltage sensor unit of the grid (13). The reversible inverter is controlled by the control unit of the reversible inverter (16), which is fed with the information of the current and the voltage on the DC bus, as well as at the converter's output. The full operation of the apparatus is controlled by the microprocessor control and switching unit (17), which is fed with information from the control unit of DC/DC converter and voltage pulse unit (15), inverter control unit (16), and from the current and voltage units at the converter's output, for the load, and for the grid.

The introduction of additional voltage pulse unit between the SP and DC/DC converter and design of the control unit for DC/DC converter with the option of controlling the voltage pulse unit ensure the effective extraction of power from the solar panel unit, increase the energy received from the solar panel unit, improve the flexibility and functionality of the consumer energy system built on such converter, and increase the reliability of the power supply to the consumers. By regularly applying voltage pulses to the SP, the voltage pulse unit (22) "pulls out" of the SP the additional electrons which, in case of traditional methods of the power extraction, would not reach the conductor and would recombine with holes in the SP itself. This allows to obtain more energy from the SP than in case of using any traditional method of the power extraction.

The system can also have a rechargeable battery (19) and a unit of bidirectional DC/DC converter for charging/discharging the rechargeable battery (18).

The system can also have a supercapacitor unit (SCU) (21) and a bidirectional DC/DC converter for charging/discharging the supercapacitor unit (20).

When RB and SCU are introduced into the system, the system of guaranteed power supply contains a control unit for RB and SCU (23).

This allows to additionally improve the reliability of guaranteed power supply to the consumers which is provided, among other things, by using the energy storage units that receive the energy from solar panels and the grid based on a specified algorithm and, in the event of the grid's failure or a decrease in the energy received from solar panels, ensure uninterrupted power supply to the consumers by adding energy from the storage unit to the energy received from solar panels on a common DC bus, and subsequently converting it into AC and supplying power to the consumers.

The power supply apparatus can also serve as a source for microgeneration of RES energy to the grid, and as a source of power supply from RES to the consumers; and as a guaranteed source of power supply to the consumers in case of power grid failure.

The embodiments of the apparatus with different configurations are described below.

1. Without RB, SCU.

The energy is extracted from solar panels at the maximum power point based on the reduction of parasitic recombination and is converted into AC voltage of the grid. Next, the microcontroller analyzes the current and voltage at the load and in the grid. If the energy from the solar panels is sufficient to power the load, the inverter disconnects the grid from the load and the power is supplied only by the solar panels. If the load consumes less energy than generated by the solar panel unit (SPU), the inverter sends part of the energy received from the SPU to the load and part of it to the grid. If the energy consumed by the load exceeds the energy generated by the SPU, the inverter feeds all energy received from the SPU to the load and receives the deficient amount of energy from the grid for the load. When there is no load, all energy received from the SPU is fed to the grid.

2. With RB and/or SCU.

When the system has RB and/or SCU, this does not change the general algorithm of operation described above, but there are more variants of system operation. When the energy is available from the SPU and part of it is consumed by the load, the remaining energy is used to charge the RB and/or SCU. Once they are fully charged, the energy is fed to the grid. If the grid voltage fails, the control and switching microcontroller disconnects the grid from the system and the load, and the power is supplied to the consumers from the SPU. If there is a shortage of energy available from the SPU, the DC bus is supplied with stored energy from the RB and/or SCU, and such energy is subsequently converted into an AC voltage of industrial frequency to supply the power to the consumers. If the energy received from the SPU is insufficient for providing the load and keeping the RB and/or SCU charged within a certain time interval, then the inverter will operate in accordance with the specified algorithm (for example, at night time) in reverse mode by charging the DC bus from the industrial grid and, subsequently, the voltage converters will charge RB and SCU up to the specified level.

Figure 2:
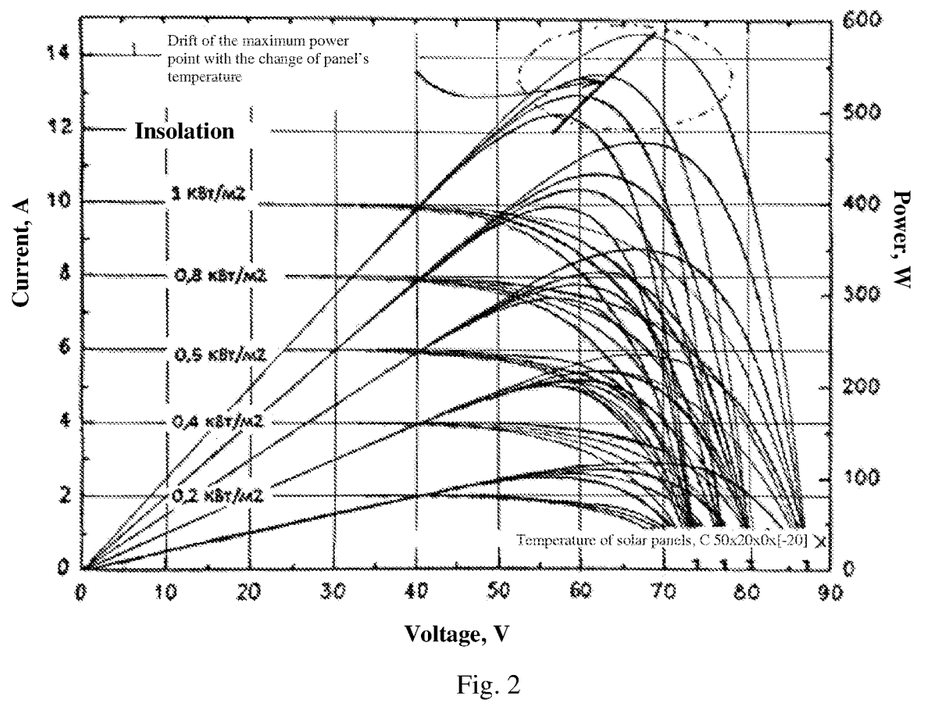
FIG. 2. The family of solar panel's volt-ampere characteristics depending on the temperature and change of uniform illumination of the panel.

The following describes the operation of the solar panel unit in various operation conditions. FIG. 2 shows the family of solar panel's volt-ampere characteristics depending on the temperature and change of uniform illumination of the panel. The volt-ampere characteristic (VAC) has a traditional form-First, there is a linear increase in power with increasing voltage followed by the achievement of the extremum, after which there is a decrease in received power with increasing voltage on the solar panel. In this case, we can see that, according to the VAC of the panel, there is only one extremum, which drifts along the VAC within a limited area with the change of temperature and uniform change of the irradiance.

With a rise in temperature, the voltage drops at the maximum power point. The extremum of the power function on the VAC shifts downward and to the left. As the temperature drops, the voltage rises at the extremum point, and the maximum power point on the VAC shifts upward and to the right. When the uniform illumination of the panel decreases, the current at the maximum power point drops and the power extremum shifts downward. When the uniform illumination of the panel rises, the current increases, and, therefore, the maximum power point shifts upward.

Figure 3:
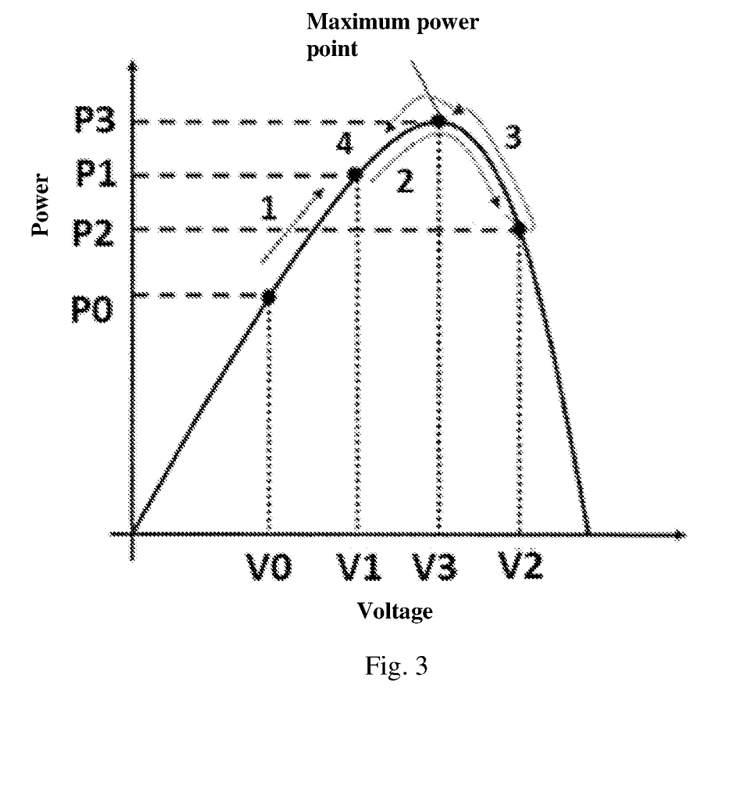
FIG. 3. The essence of the perturbation and observation method for maximum power point tracking.

There are various known algorithms for maximum power point tracking. These include, for example, the perturbation and observation method or the method of increasing conductivity. The essence of perturbation and observation method is shown in FIG. 3. The voltage and current are measured on the solar panel unit (SPU). The power point P0 is calculated. Next, the output voltage of the SPU is changed by controlling the converter (positive voltage increment). The current and voltage are measured. This allows to determine the power point P1. P1 is compared to P0, and if P1 is greater, then the voltage increment continues to be in place and the method proceeds to the next step. The voltage is increased on the panel unit. The current is measured. The power point P2 is calculated. Next, the points P3 and P4 are also calculated. If the new power point is lower than the previous one, the symbol of the increment changes from positive to negative. There are also adaptive algorithms, where the increment step is not constant, but varies depending on the proximity to the extremum. The step decreases near the extremum to reduce the ripple of the power extracted from the solar panel unit.

As a result, with a smooth change of temperature and uniform change of panel illumination, the traditional algorithm for maximum power point search tracks how the extremum drifts across the VAC of the solar panel within a given area.

In fact, all existing methods of extracting power from the SP are equivalent to connecting a rheostat to the solar panel and, by automatically adjusting "its impedance," ensure that DC current is extracted from the SP at the maximum power point on the VAC.

The efficiency of modern industrially produced SPs, from which the energy is extracted by using a traditional ("rheostat") method, is in the range of 18%-23%. In other words, 1 KW of solar photon energy will produce 180-230 watts of electricity on an equivalent rheostat of the load.

The rest of the energy from solar radiation is lost in the SP. The following is referred to the main processes that result in low efficiency of SP: reflection of some radiation from the semiconductor's surface, inactive light quanta absorption, parasitic recombination of nonequilibrium carriers, etc.

Figure 4:
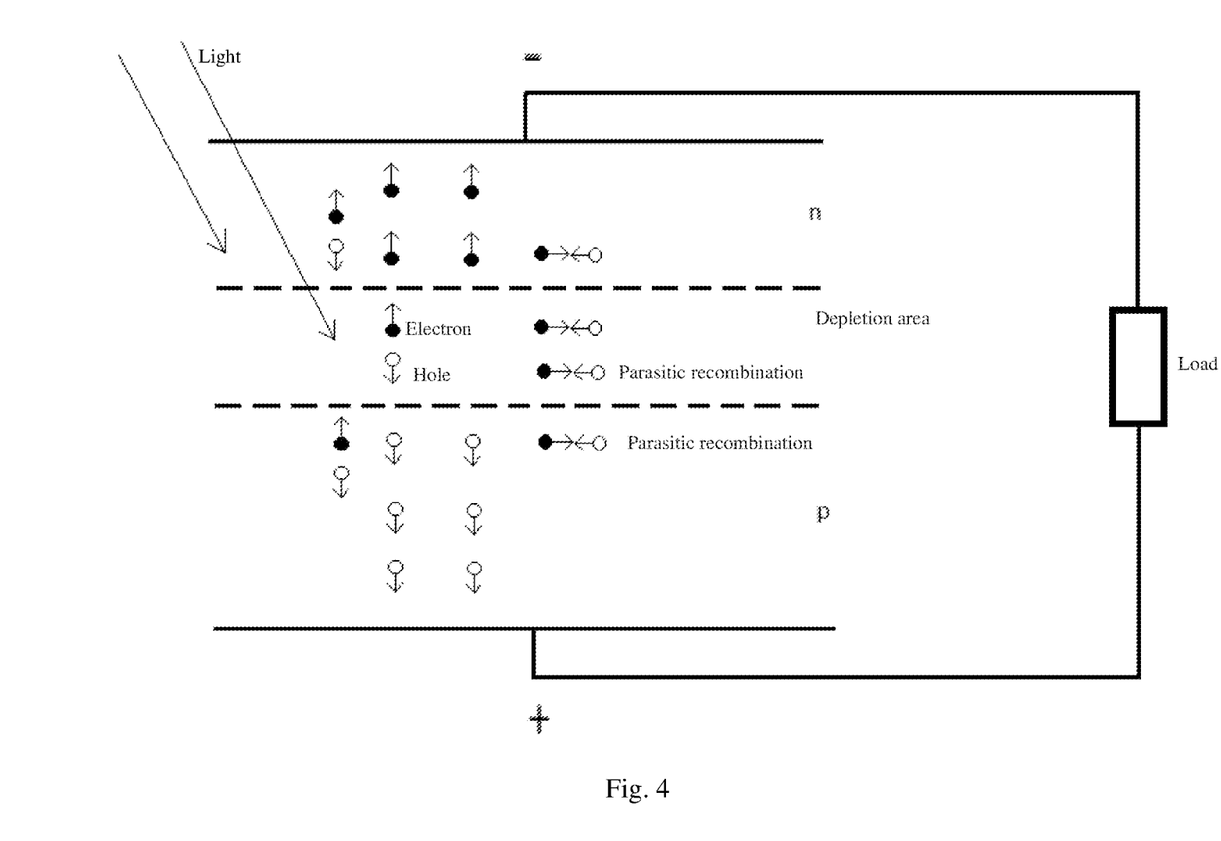
FIG. 4. A simplified view of the solar panel diagram.

A simplified view of the SP operation is presented in FIG. 4. In FIG. 4, light falls on the SP and travels to the areas 'n', 'p' and the depletion area. In the depletion region, the energy of photons is transferred to the electron-hole pair. They are separated. Due to the internal field, the electrons move up through the 'n' area to the conductor and then into the load.

After the load, the electrons return through the conductor to the SP on the side of the 'p' area and recombine with holes.

This is how the energy of photons is converted into electric energy.

After the electrons and holes are separated by solar light, some of the electrons fail to reach the conductor and, hence, the load. In the process of motion of the electrons and holes, a parasitic recombination of electrons and holes occurs in the depletion area and, partially, in the 'n' and 'p' areas. As a result, most of the energy received by the SP from the sun fails to reach the load due to the parasitic recombination process.

To reduce the energy losses caused by parasitic recombination, we introduce a pulse voltage unit between the SP and the load. Its purpose is to use short pulses of certain amplitude, frequency (period), duration, with certain rising and falling edges to apply a positive potential to the 'n' area and a negative potential to the 'p' area of the SP, or an aperiodic alternating voltage pulse.

Figure 7:
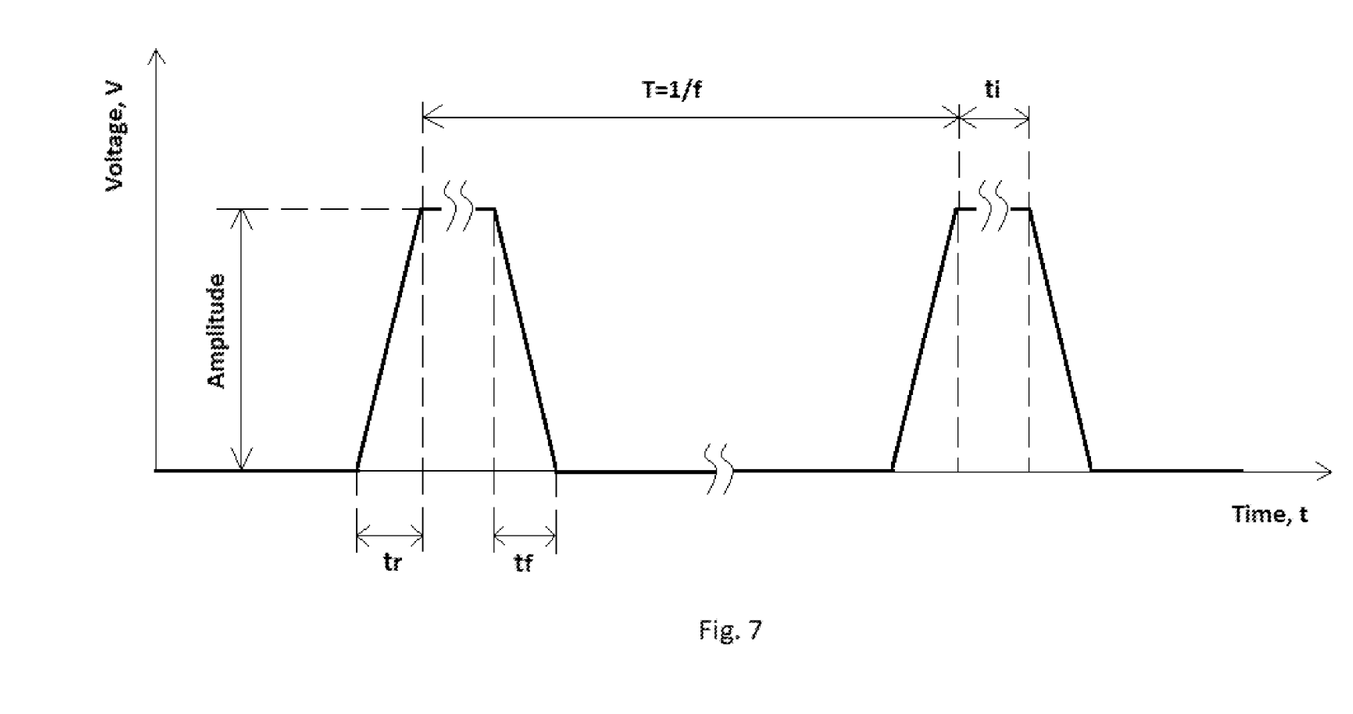
FIG. 7. Possible shape of voltage pulses applied to solar panels.

FIG. 7 shows a possible shape of the voltage pulses applied to the solar panel.

T is the repetition period of voltage pulses;
f=1/T is the frequency of voltage pulse repetition;
ti is the duration of voltage pulses;
tr is the duration of the rising edge of the voltage pulse (rise);
tf is the duration of the falling edge of the voltage pulse (fall);

The voltage pulses are applied to the solar panel in order to give the electrons and holes, which received energy from photons, additional impulse when they move from the depletion area to the conductor. As a result of these voltage pulses, the probability of parasitic recombination decreases, the number of electrons reaching the conductor and the load rises and, therefore, the amount of energy received from the solar panel and the efficiency of the SP-converter system improves.

The voltage pulses are generally controlled in terms of their amplitude, frequency (f), duration (ti), polarity, and the duration of rise (tr) and fall (tf) of the voltage pulse edges (dU/dt). It is also possible to apply an aperiodic alternating signal to a solar panel array. It should be noted that the voltage amplitude, frequency and duration of pulses are parameters that are set for a given package and type of panels, and subsequently they are practically not changed (such embodiment is possible) or are changed slowly enough in the process of automatic adjustment. When changing the illumination and temperature of solar panels, the main adjustment parameters are the rising and falling edges of voltage pulses.

For this reason, the system for controlling the pulse voltage source and the embodiment of the pulse voltage source installed between the solar panels and the DC-DC converter, or load, or inverter-must provide an option to create and adjust the voltage pulses in terms of amplitude, frequency, duration (duty cycle), polarity and rise and fall time of the voltage pulses. The maximum increase of the energy obtained from solar panels can be achieved only by controlling all these parameters.

It should be noted that voltage pulses have duration at the level of microsecond units or less, so the energy consumed to create them is by an order of magnitude less than the energy of electrons, which do not lose the energy during parasitic recombination and are fed to the load. Also, for the positive polarity of the voltage pulse applied to the 'n' area of the SP, the p-n junction of the SP is equivalent to a closed diode.

When this "control" voltage is applied, a large number of electrons, which received energy from light quanta and were previously recombined with holes and failed to reach the load, leave the 'n' layer of the SP, thus increasing the useful energy and efficiency of the SP by 1.5-1.7 times under intense illumination relative to traditional ("rheostatic") methods of power extraction from the SP. To some extent, this principle can be compared, in a figurative way, to the operation of a field-effect transistor, when we control the opening of the channel and the passage of the power current through the p-n junctions of the field-effect transistor by the electric field of the gate, virtually without wasting the current.

The analysis of the patent US2015244313 A1 "Method and apparatus for tracking maximum power point for inverters, for example, in photovoltaic applications", IPC GOIR 31/40, Aug. 27, 2015, shows that it does not implement a control system and a pulse source apparatus itself with an option to adjust the rising and falling edges of voltage pulses depending on the illumination and temperature of solar panels. As a result, there is less energy obtained from the solar panels. The authors of that patent claim a 1.2 increase of energy produced from the solar panels at full illumination.

In all traditional converters, the control unit of the DC/DC voltage converter ensures that the voltage from the solar panels is increased to the voltage level of the DC bus, from which the inverter is subsequently supplied, by adjusting the duty cycle of the key. In our case, this control unit also has a built-in function to additionally control a voltage pulse unit, wherein the control function of such unit is aimed at obtaining more energy from the solar panels. In other words, now it not only increases the voltage, but also adjusts the energy inflow from the solar panels, thereby ensuring the output voltage on the DC bus. The inverter control unit then extracts energy from the bus in the amount that the control unit and solar panels can provide at any given time.

Figure 5:
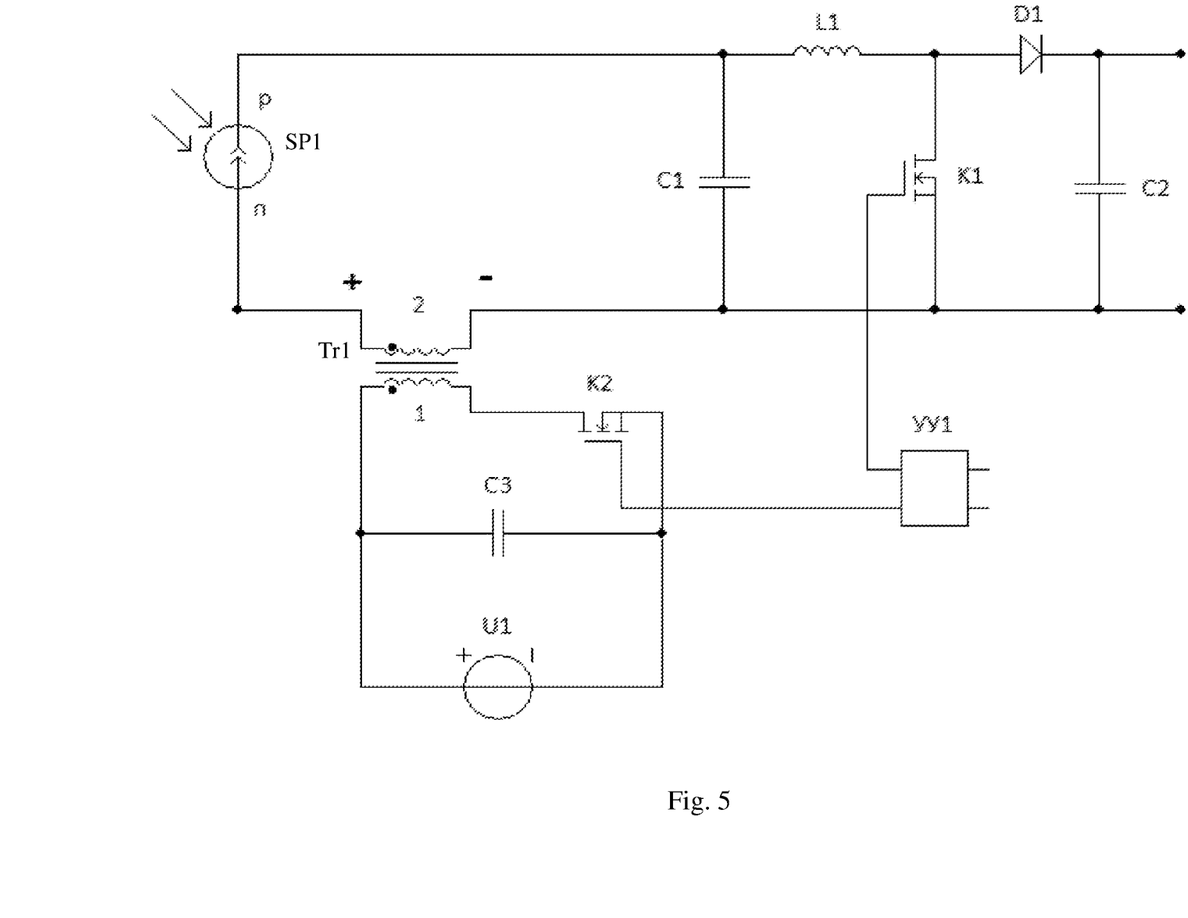
FIG. 5. A potential embodiment.

There are many circuitry methods to implement the described method of increasing the efficiency of the SP-converter system. FIG. 5 shows one of the possible embodiments.

FIG. 5 shows a solar panel SP1, a storage capacitor C1, a step-up voltage converter comprising capacitors C2, a choke L1, a diode D1, a key K1, a pulse source comprising a transformer Tr1, a capacitor C3, a key K2, a power supply U1 and a common control apparatus UU1.

The control apparatus UU1 generates control signals for the keys K1 and K2. When the key K2 briefly switches to the open state, a current pulse passes through the primary winding 1 of the transformer Tr1. A voltage pulse is generated on the secondary winding of transformer Tr1. Through capacitor C1, it is applied, with positive polarity, to 'n' area of solar panel SP1 and, with negative polarity, to 'p' area of solar panel SP1. At the same time, the key K1 is periodically opened in accordance with the specified operating algorithm, which results in generating a voltage on the capacitor C2. Next, the voltage on the capacitor C2 is supplied either to the load or to the voltage inverter.

The light falling on the solar panel SP1 separates electrons and holes. The electrons move along the circuit and charge the capacitor C1. At the same time, the positive voltage pulses of a given frequency, duration, amplitude, rising and falling edges are applied to the 'n' region of the solar panel through the pulse transformer Tr1; and, as a result, the probability of parasitic recombination of electrons and holes decreases, and an additional number of electrons energized by light photons reaches the conductor and charges the capacitator C1. The voltage is then increased by the step-up converter (L1, K1, D1, C2) to the level required for the load or for the voltage inverter.

The transformer Tr1 can be made with or without ferromagnetic core.

Figure 6:
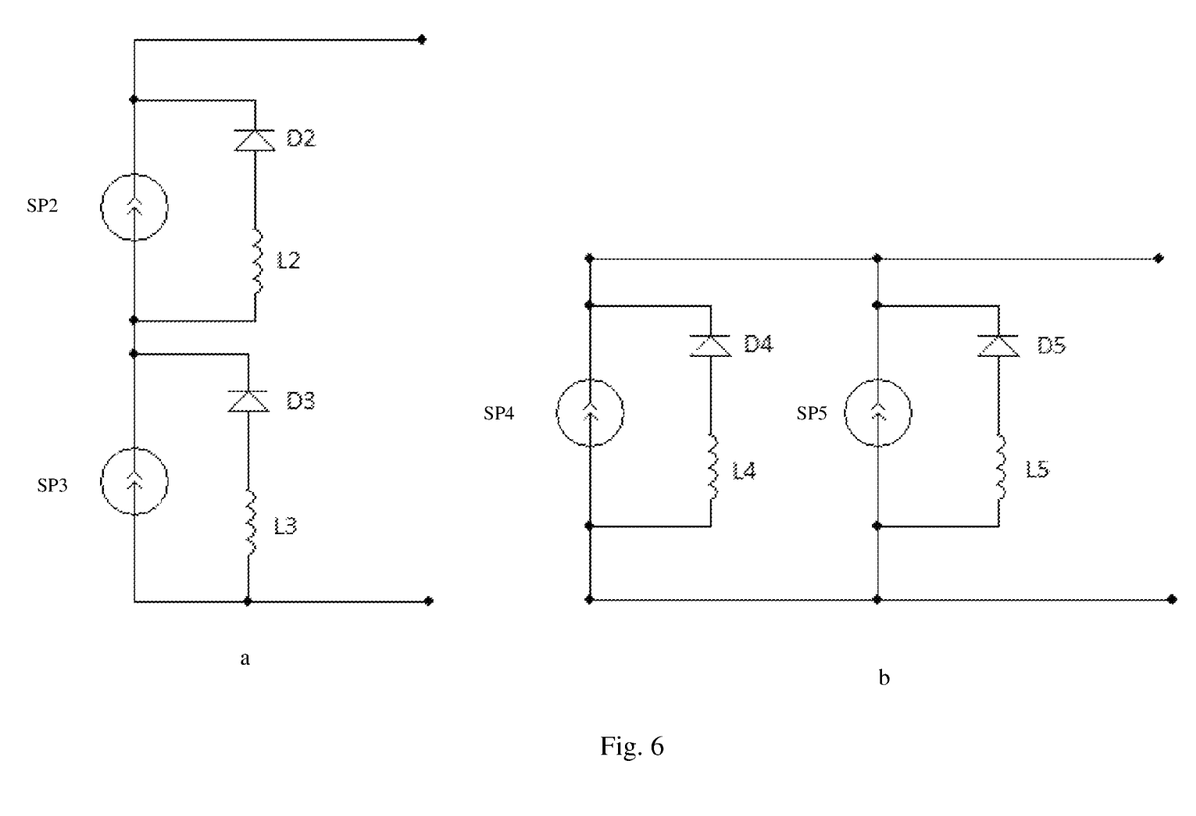
FIG. 6. A diagram of possible series (a) and parallel (b) connection of solar panels.

FIG. 6 shows the diagram of possible series (a) and parallel (b) connection of solar panels based on an example of two panels. When SPs are connected in units, the diodes are connected in parallel with the SPs to bypass the current when the SPs are partially shaded in the panel unit. To prevent these diodes from shunting the pulse signals that are applied to the solar panels, the chokes (L2-L4) are installed in series with each of the diodes (D2-D4). These DC chokes have virtually no impedance, and when partially shaded, the DC current passes through the diodes. In this case, when exposed to voltage pulses from transformer Tr1 (FIG. 5) lasting for units of microseconds or less, the chokes D2-D4 have a high wave impedance and do not shunt these pulses.

The claimed solution allows to increase the amount of energy obtained from an array of solar panels under real-life operating conditions. This is of paramount importance for both off-grid and grid-connected systems, as it ultimately affects the amount of energy received from solar panels and the payback period of the system as a whole.

The invention claimed is:

1. A power supply apparatus based on photovoltaic panels, which comprises a solar panel unit, a current and voltage sensor unit of solar panel unit, a DC/DC converter, a DC bus, an inverter, a current and voltage sensor unit at the converter's output, a DC/DC converter control unit, an inverter control unit, a control and switching microcontroller, a current and voltage sensor unit of DC bus, an LC filter and a radio interference filter, a current and voltage sensor unit for the load, and which is characterized in that it additionally includes a voltage pulse unit installed between the solar panel and the DC/DC converter, wherein the control unit of the DC/DC converter is made with an additional function for controlling the voltage pulse unit and with an option to adjust voltage pulses in terms of their amplitude, frequency, duration, polarity, as well as in terms of the pulse rise timer and pulse fall time.

2. A power supply apparatus based on photovoltaic panels according to claim 1 and characterized in that it includes a bidirectional DC/DC converter for charging/discharging a rechargeable battery and a rechargeable battery.

3. A power supply apparatus based on photovoltaic panels according to claim 1 and characterized in that it includes a bidirectional DC/DC converter for charging/discharging a supercapacitor unit and a supercapacitor unit.

* * * * *